US010272415B2

(12) United States Patent
Li et al.

(10) Patent No.: US 10,272,415 B2
(45) Date of Patent: Apr. 30, 2019

(54) METHOD FOR PREPARING NOBLE METAL CATALYST

(71) Applicant: Sinocat Environmental Technology Co., Ltd., Chengdu (CN)

(72) Inventors: Dacheng Li, Chengdu (CN); Yun Li, Chengdu (CN); Yun Wang, Chengdu (CN); Qin Wang, Chengdu (CN); Yongxiang Cheng, Chengdu (CN); Yaoqiang Chen, Chengdu (CN)

(73) Assignee: Sinocat Environmental Technology Co., Ltd., Chengdu (CN)

( * ) Notice: Subject to any disclaimer, the term of this patent is extended or adjusted under 35 U.S.C. 154(b) by 98 days.

(21) Appl. No.: 15/500,714

(22) PCT Filed: Mar. 27, 2015

(86) PCT No.: PCT/CN2015/075248
§ 371 (c)(1),
(2) Date: Jan. 31, 2017

(87) PCT Pub. No.: WO2016/011828
PCT Pub. Date: Jan. 28, 2016

(65) Prior Publication Data
US 2017/0216820 A1 Aug. 3, 2017

(30) Foreign Application Priority Data

Jul. 22, 2014 (CN) .......................... 2014 1 0350817

(51) Int. Cl.
| | | |
|---|---|---|
| *B01D 53/94* | (2006.01) | |
| *B01J 21/04* | (2006.01) | |
| *B01J 23/42* | (2006.01) | |
| *B01J 23/44* | (2006.01) | |
| *B01J 23/46* | (2006.01) | |
| *B01J 23/63* | (2006.01) | |
| *B01J 35/04* | (2006.01) | |
| *B01J 37/00* | (2006.01) | |
| *B01J 37/02* | (2006.01) | |

(Continued)

(52) U.S. Cl.
CPC ............ *B01J 23/46* (2013.01); *B01D 53/944* (2013.01); *B01J 21/04* (2013.01); *B01J 23/42* (2013.01); *B01J 23/44* (2013.01); *B01J 23/63* (2013.01); *B01J 35/04* (2013.01); *B01J 37/0036* (2013.01); *B01J 37/0205* (2013.01); *B01J 37/0207* (2013.01); *B01J 37/038* (2013.01); *B01J 37/08* (2013.01); *B01D 2255/1021* (2013.01); *B01D 2255/1023* (2013.01); *B01D 2255/2063* (2013.01); *B01D 2255/2092* (2013.01); *B01D 2255/20715* (2013.01); *B01D 2258/018* (2013.01)

(58) Field of Classification Search
CPC ... B01J 23/46; B01J 21/04; B01J 23/42; B01J 23/63; B01J 35/04; B01J 37/0036; B01J 37/0205; B01J 37/0207; B01J 37/038; B01J 37/08; B01D 53/944
See application file for complete search history.

(56) References Cited

U.S. PATENT DOCUMENTS

| | | | | |
|---|---|---|---|---|
| 6,540,843 | B1* | 4/2003 | Liu | ................... B01D 53/8625 148/243 |
| 2002/0015674 | A1* | 2/2002 | Taniguchi | ............ B01D 53/945 423/213.2 |

(Continued)

FOREIGN PATENT DOCUMENTS

| | | |
|---|---|---|
| CN | 1850340 A | 10/2006 |
| CN | 101385973 A | 3/2009 |
| CN | 104056626 A | 9/2014 |

OTHER PUBLICATIONS

International Search Report and Written Opinion; International Searching Authority/CN dated Jul. 3, 2015; International Application No. PCT/CN2015/075248; 13 pages; International Searching Authority/State Intellectual Property Office of the P.R. China; Beijing China.
Li Dacheng et al.; "Preparation Method of Noble Metal Catalyst"; Bibliographic data of CN104056626 (A); Sep. 24, 2014; http://worldwide.espacenet.com.
Xiao Yan et al.; "Preparation Method of Cleaning Catalyst Capable of Increasing Low-Temperature Initiation Performance"; Bibliographic data of CN101385973 (A); Mar. 18, 2009; http://worldwide.espacenet.com.
Gong Chen Zezhi; "Method for Preparing Catalyst for Purifying Volatile Organic Compound"; Bibliographic data of CN1850340 (A); Oct. 25, 2006; http://worldwide.espacenet.com.

(Continued)

*Primary Examiner* — Melvin C. Mayes
*Assistant Examiner* — Michael Forrest
(74) *Attorney, Agent, or Firm* — Andrew D. Fortney; Central California IP Group, P.C.

(57) ABSTRACT

The present invention discloses a method for preparing a catalyst, comprising the following steps: (1) taking a noble metal salt solution A, adding a modified alumina support material, stirring until uniform and standing; (2) drying the material obtained in step (1) in a vacuum, and calcining at 500° C.-600° C. for 1-4 hours to obtain a powder material containing the noble metal; (3) mixing the noble metal powder material, an adhesive and other components to be added, and ball-milling to obtain a uniform slurry; (4) preparing a noble metal solution B and adjusting pH to 0.5-1; and (5) mixing the slurry of the step (3) with the noble metal solution B, coating the mixture on a support, drying, and calcining at 500° C.-600° C. for 1-2 hours to obtain the target product. The method for preparing the catalyst of the present invention is simple, the conditions of the preparation process are easy to control and the preparation method has strong practicality. The prepared catalyst has a good quality, a low ignition temperature and a high catalytic conversion rate for methane at a relatively low temperature.

20 Claims, 2 Drawing Sheets

(51) Int. Cl.
*B01J 37/03* (2006.01)
*B01J 37/08* (2006.01)

(56) References Cited

U.S. PATENT DOCUMENTS

2008/0187477 A1 8/2008 Nochi et al.
2009/0275463 A1 11/2009 Keshavan et al.

* cited by examiner

METHOD FOR PREPARING NOBLE METAL CATALYST

RELATED APPLICATIONS

This application is a national phase application of International Application No. PCT/CN2015/075248, filed Mar. 27, 2015, which claims the benefit of Chinese Patent Application No. 201410350817.1, filed Jul. 22, 2014, incorporated herein by reference in its entirety.

TECHNICAL FIELD

The present invention relates to a method for preparing a noble metal catalyst, in particular to preparation of a catalyst containing a platinum-based noble metal and a lanthanum-based rare earth. The catalyst of the present invention is particularly suitable for treatment of exhaust from lean-burn natural gas engines.

BACKGROUND ART

As the energy and environment issues become increasingly urgent, higher requirements are imposed on emission control of automobile exhaust, so as to protect the environment and save energy. In China, National V Emission Standard of Natural Gas Engines is issued on Jan. 1, 2013. China has abundant natural gas, and natural gas as fuel is widely used in both buses and taxis in many cities. Also, as sustainable energy, natural gas will be applied to automobile fuels in future. Therefore, it is imperative to strengthen the research on post-treatment technology for emission control of natural gas vehicles, and as a key part of the post-treatment technology, catalysts are particularly important. As compared to gasoline vehicles, the exhaust catalyst technology for natural gas vehicles is still in the initial stage of development and is not technically mature enough.

Zhao Bin et al. (Journal of the Chinese Society of Rare Earths, Article ID: 1000-4343(2003)-0098-03) prepares a natural gas purification catalyst by using La—$Al_2O_3$, La—$Al_2O_3$+$CeO_2$—$ZrO_2$ and La—$Al_2O_3$+$CeO_2$—$ZrO_2 \cdot MnO_x$ as support materials and adding the support materials together with additives and noble metals during the ball-milling slurry-making process. According to this invention, the noble metals are liable to migrate from the inside to the coating surface, which leads to the reduction of noble metal concentration from the surface to the inside, over-accumulation of noble metals on the surface, and high loss rate, and finally causes poor catalyst performance.

Chinese patent (CN200810225539.1) prepares a catalyst by performing ball-milling on catalytic materials to a certain particle size, impregnating with noble metals, oven-drying and calcining to make powders, then performing ball-milling to make a slurry, applying the slurry to a ceramic honeycomb support, oven-drying and calcining. This method has the advantage that the noble metals are supported on a fixed material before milling, which prevents the noble metals from migrating during slurry milling According to this invention, the noble metals are dispersed on the powder surface before milling, the powders are destroyed and broken to form new sections during slurry milling; however, these new sections do not have noble metals to implement catalysis effect, resulting in low catalyst performance.

SUMMARY OF THE INVENTION

The present invention aims to overcome the problem in the prior art that it cannot be catalyzed without noble metals on sections of automobile exhaust catalyst powders that are newly formed during the ball-milling slurry-making process to reduce the catalyst performance, and provides an automobile exhaust catalyst and a preparation method thereof.

In order to achieve the above purpose, the present invention provides the following technical solution:

A method for preparing a catalyst, including the following steps:

(1) taking a noble metal salt solution A, adding a modified alumina support material, stirring until uniform and standing;

(2) drying the material obtained in step (1) in a vacuum, and calcining at 500° C.-600° C. for 1-4 hours to obtain a powder material containing the noble metal;

(3) mixing the powder material containing the noble metal prepared in step (2) with an adhesive and performing ball-milling, to obtain a uniform slurry;

(4) preparing a noble metal solution B and adjusting pH to 0.5-1; and (5) mixing the slurry obtained in step (3) with the noble metal salt solution B, coating the mixture on a support, drying, and calcining at 500° C.-600° C. for 1-4 hours to obtain a target product.

The noble metal in the noble metal salt solution A and the noble metal salt solution B is one or more of palladium, platinum and rhodium. The noble metal salt solution A and the noble metal salt solution B may be the same or different.

The noble metal salt solution A is a noble metal soluble salt solution, and the noble metal is specifically palladium and/or platinum, and more specifically nitrate, hydrochloride or ammonia salt thereof.

A concentration of the noble metal salt solution A is 0.1-2.0 wt %. A weight ratio of Pd to Pt is Pd:Pt=1:0-0:1 (by weight). The noble metal salt solution A is added in advance, and usage percentage of the added noble metal components is controlled according to features that noble metal components have effect on the alumina support, so that the amount of noble metal pre-bonded on the alumina is suitable, the bonding efficiency is optimal, utilization of the noble metal is good, and stability of finished product is strong. More preferably, the noble metal is palladium and platinum with a weight ratio platinum:palladium of 1:7-1:4.2 (by weight). If the content of noble metal components in the noble metal salts is controlled within this range, an ignition temperature of catalysts in a product is greatly reduced while a conversion rate is greatly increased, thereby better improving an engine exhaust emission value.

The noble metal salt solution B is a noble metal soluble salt solution, and the noble metal is specifically palladium and/or platinum, and specifically nitrate, hydrochloride or ammonia salt thereof.

A concentration of the noble metal salt solution B is 0.1-2.0 wt %. A weight ratio of Pd to Pt is Pd:Pt=1:0-0:1 (by weight). The supplementary noble metal salt solution B is screened and adjusted according to the features of components of the noble metal salt solution A and pre-bonded alumina support, and the proportion of components in the supplementary noble metal salt solution B is controlled, so that content of the noble metal components supported on the alumina is optimized, thereby improving the positive interaction among the noble metal components, substantially reducing the ignition temperature of catalysts and greatly improving the performance. The supplementary noble metal components are determined by the support condition of the pre-bonded alumina, more preferably, the noble metal in the noble metal salt solution B is palladium and platinum which have a weight ratio: palladium:platinum=6.5:1-1:7 (by weight), amounts of the palladium and platinum are quantified to well bond with the pre-bonded alumina support, leading to a good supplementary bonding effect, thereby greatly improving the catalyst overall conversion capacity.

In the present invention, a part of noble metals is pre-supported on the material, another part of noble metals is supplemented during slurry milling, and the supplemented noble metals may be held on the material surfaces that are newly formed during slurry milling, as a result, the performance of the catalyst finished product is improved. The key points of the present invention lie in: the ratio of the noble metals that are previously and fixedly supported to the noble metals that are occupying a new material surface is controlled within a certain range, the pH value of the noble metal solution that is added during slurry milling needs to be controlled within a certain range, the noble metal components that are supplemented are effectively attached to the surface of a particle that is formed after milling, the catalyst exhibits better performance, and the catalyst performance is advantageously improved.

According to the present invention, before the noble metal salt solution B is added, the pH value thereof is appropriately adjusted to be equal to the pH value of the slurry obtained by ball-milling, and after mixing, the bonding effect of noble metals and modified alumina materials is improved, and the attachment to support surface is increased.

Further, other common additives may be added in step (3) to promote the support and formation of the catalyst.

Further, the modified alumina support material is $La—Al_2O_3$, $\gamma-Al_2O_3$ or other modified alumina powder materials. The modified alumina material is generally subject to high-temperature pretreatment, exhibits excellent stability, and has good support activity and stability as a support.

Further, the time for standing in step (1) is more than 0.5 hours, and after standing for a while, the mixture of the noble metal salt solution A and the alumina support becomes gradually stabilized by virtue of the uniformity of dispersion of non-metal components. Preferably, the time for standing is 1-2 hours, and the stability of the mixture is good as long as the standing time is appropriate.

Further, a ratio of content of noble metal components in the noble metal solution A to content of noble metal components in the noble metal solution B is 1:9-9:1 (by weight), preferably 4:1 (by weight).

Further, the content of noble metals in the prepared catalyst is 0.5%-2% (by weight). Depending on the support capacity of the alumina support to the noble metals, 0.5%-2% of noble metals is added such that all the added noble metals can play a good catalysis role.

Further, the content in percentage by weight of the noble metal salt solution A that is supported on the material and the content in percentage by weight of the noble metal salt solution B that is added during slurry milling are preferably as follows:

in a case in which the total noble metal content is 2.0 wt %, the concentration of the noble metal salt solution A is 1.6 wt %, where a weight ratio of Pt to Pd is Pd:Pt=7:1, and the concentration of the noble metal salt solution B is 0.4 wt %, where a weight ratio of Pt to Pd is Pd:Pt=2:1.

Further, water content in the noble metal salt solution A in step (1) is 90% to 100% (by weight) of the water absorption capacity of the added modified alumina. The water absorption capacity refers to the amount of water required for making $La—Al_2O_3$ or $\gamma-Al_2O_3$ containing Al or rare earth modified alumina powder just become viscous after water adding. In order to keep powdery during the support process, and the addition amount of modified alumina should be appropriate.

Further, the vacuum drying temperature in step (2) is 80° C.-100° C., the temperature of pre-calcination treatment should not be too high, so as to keep good stability of the components and allow one-step conversion into the target product through the calcinations process, thereby improving the stability and conversion performance of the catalyst. Preferably, the time for drying in a vacuum is 6-10 hours, most of water is removed by vacuum drying, which facilitates the formation of stable structure by bonding of the alumina support and the noble metal components.

Further, the slurry obtained in step (3) and the noble metal salt solution B are mixed and the mixture stands for 0.5-2 hours, so that the noble metal ions in the solution B are dispersed uniformly and the noble metal components in the solution are attached to the pores that are newly formed on the powder surface during slurry milling, thereby improving the utilization rate of the noble metal salt solution B.

Further, the support is a ceramic honeycomb support or a metal honeycomb support, and the honeycomb support features a large specific surface area and good catalysis effect after supporting the catalyst components, and is a good support. A cordierite ceramic honeycomb support is preferred, and cordierite ceramics have excellent resistance to high temperature, can keep good activity in harsh environments, and are not likely to be inactive or useless. A cordierite ceramic honeycomb support of 400-600 meshes is preferred, and the support of 400-600 meshes can provide enough pore space to the noble metal catalyst powder obtained by milling and prevent the noble metal components from falling off, thereby ensuring longer service life of the prepared catalyst material.

Further, the usage amount of modified alumina as support is appropriately adjusted and optimized according to the target noble metal content percentages.

As compared to the prior art, the present invention has the following benefits: the preparation method of the inventive catalyst is simple, has easily-controllable preparation process conditions, and has strong applicability. A part of noble metals is impregnated on the material and then calcined at 500° C.-600° C., to obtain noble metal-containing powder. During milling, the mixture of other components as well as the adhesive is added to make uniform slurry. The slurry is completely combined with the rest part of noble metals as supplement, followed by coating, drying and calcining, to obtain a high-quality catalyst that has excellent conversion rate in terms of catalytic conversion of methane at a lower temperature.

DETAILED DESCRIPTION OF THE INVENTION

A catalyst for automobile exhaust treatment is provided, where the catalyst is made by supporting a part of noble metal A on La—Al$_2$O$_3$ or γ-Al$_2$O$_3$ which contains Al or modified alumina, a part of noble metal B is added during catalyst milling, where the noble metal is Pt and/or Pd, the contents in percentage by weight of the noble metals are as follows: the concentration of the noble metal A that is supported on the material is 0.1%-2.0%, where a weight ratio of Pt to Pd is Pd:Pt=1-0:0-1; the concentration of the noble metal B that is added during slurry milling is 0.1%-2.0%, where a weight ratio of Pt to Pd is Pd:Pt=1-0:0-1; and the pH value of the noble metal B solution that is added during slurry milling is 0.5-1.0.

Further, the contents in percentage by weight of the noble metal A supported on the material and the noble metal B added during slurry milling are as follows: the concentration of A is 1.6%, where the weight ratio of Pt to Pd is Pd:Pt=7:1; and the concentration of B is 0.4%, wherein the weight ratio of Pt and Pd is Pd:Pt=2:1.

A method for preparing a catalyst, including the following steps: (1) weighing corresponding La—Al$_2$O$_3$ or γ-Al$_2$O$_3$ containing Al or modified alumina powders according to the above mentioned catalyst composition; (2) weighing solution A according to the above mentioned catalyst composition, adding an appropriate amount of water with a water addition amount of 0.9 to 1.0 times than a water absorption amount of the material in step (1), and mixing until uniform; (3) adding the powder material obtained in step (1) to the solution in step (2), stirring rapidly until uniform, standing for larger than or equal to 1 hour, drying in a vacuum at 80° C. for 8 hours, and calcining at 550° C. for 2 hours to obtain a powder material containing the noble metal; (4) adding an adhesive to a mixture of the noble metal powder material obtained in step (3) and other components required to be added, and ball-milling until uniform; and (5) adjusting pH of the solution B to 0.5-1.0, adding to (4) to prepare a slurry, coating it on a catalyst support after standing for 1 hour, drying at 120° C. for 2 hours, and calcining at 550° C. for 2 hours to obtain a catalyst.

Comparative Example 1

Preparation of a Catalyst to which Noble Metals are all Added when they are Firstly Supported A platinum nitrate solution and a palladium nitrate solution (containing 3.333 g of Pt and 16.667 g of Pd) are respectively weighed and added to 800 g of deionized water, and stirred until uniform. 980 g of La—Al$_2$O$_3$ powder is added to a mixed solution, which is rapidly stirred until uniform and then stands for 1 hour. Then the solution is dried in a vacuum at 80° C. for 8 hours and calcined at 550° C. for 2 hours, to obtain Pd—Pt/La—Al$_2$O$_3$ powder (which is yellowish brown powder). An adhesive is added to the yellowish brown powder to prepare a slurry, and the slurry is coated on a cordierite ceramic honeycomb support having a mesh number of 400 cell/in$^2$ and a volume of 2.5 ml, and is then dried and calcined, to obtain a platinum-palladium catalyst having a noble metal content of 80 g/ft$^3$.

Comparative Example 2

Preparation of a Catalyst to which Noble Metals are all Added During Slurry Milling An adhesive is added to 980 g of La—Al$_2$O$_3$ powder to prepare a slurry, and a platinum salt solution and a palladium salt solution (containing 3.333 g of Pt and 16.667 g of Pd) are added, and ball-milled until uniform. The slurry is coated on a cordierite ceramic honeycomb support having a mesh number of 400 cell/in$^2$ and a volume of 2.5 ml, and is then dried and calcined, to obtain a platinum-palladium catalyst having a noble metal content of 80 g/ft$^3$.

Example 1

Preparation of a Catalyst with a Ratio of an Amount of Noble Metal Firstly Supported (Pt:Pd=1:5) to an Amount of Noble Metal During Slurry Milling (Pt:Pd=1:5) of 2:8

A platinum salt solution and a palladium salt solution (containing 0.6666 g of Pt and 3.3334 g of Pd) are respectively weighed and added to 800 g of deionized water, and stirred until uniform. 980 g of La—Al$_2$O$_3$ powder is added to a palladium nitrate solution, which is rapidly stirred until uniform and then stands for 1 hour. Then the solution is dried in a vacuum at 80° C. for 8 hours and calcined at 550° C. for 2 hours, to obtain Pd—Pt/La—Al$_2$O$_3$ powder (which is yellowish brown powder). An adhesive is added to the yellowish brown powder to prepare a slurry, which is labeled as slurry A. A platinum salt solution and a palladium salt solution (containing 2.6664 g of Pt and 13.3336 g of Pd) are taken, pH of the noble metal solution is adjusted to 0.5, the solutions having adjusted their pH properly adjusted are added to the slurry A and then ball-milled and mixed until uniform, and the mixture which already stands for 1 hour is coated on a cordierite ceramic honeycomb support having a mesh number of 400 cell/in$^2$; and a volume of 2.5 ml, and is then dried and calcined, to obtain a platinum-palladium catalyst having a noble metal content of 80 g/ft$^3$.

The above various materials, nitrates and the like are all commercially available.

Detection Results:

The catalysts in the above examples are subject to an activity evaluation test. The testing conditions are as follows:
the composition in volume of gases by simulating exhaust gases of lean-burn engines: methane: 1000 ppm, carbon monoxide: 3000 ppm, carbon dioxide: 10%, nitric oxide: 1000 ppm oxygen: 6.5%, nitrogen: a balance gas; space velocity: 40000 h$^{-1}$.

Figure 1:
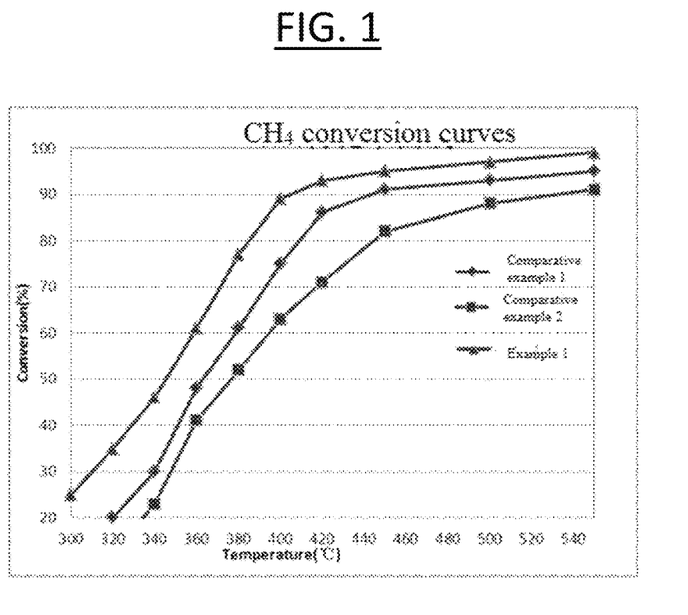
FIG. 1 is an activity evaluation result of catalysts prepared in comparative examples 1-2 and example 1.

The results are shown in FIG. 1.

FIG. 1 Methane Conversion Curves in Different Comparative Examples and Example 1

TABLE 1

Activity data of catalyst CH$_4$ in different comparative examples and Example 1

| No. | T$_{50}$ (° C.) | T$_{90}$ (° C.) |
|---|---|---|
| Comparative example 1 | 363 | 444 |
| Comparative example 2 | 377 | 530 |
| Example 1 | 346 | 405 |

It can be learned from Table 1 that:
(1) The performance of the catalyst in Example 1 for CH$_4$ is better than that of comparative example 2, which illustrates that the conversion performance of the catalyst for methane which is prepared by impregnating the powder and ball-milling a slurry after calcining is superior to that of the catalyst to which the noble metals are all added during slurry milling.

(2) Comparative example 1 and comparative example 2 are inferior in conversion performance to $CH_4$ in Example 1, which illustrates that the method that the noble metals are calcined by partially impregnating the powder material and partially added during the slurry milling is superior to the way that the noble metals are impregnated the powder material and calcined or that the noble metals are all added during ball-milling to prepare a slurry.

The particular examples by changing the ratio of the noble metal A supported on the material and the noble metal B added during slurry milling and the material types are as follows.

Example 2

Preparation of a Catalyst Firstly Supported with a Noble Metal Pd, and Supplemented with a Noble Metal Pt During Slurry Milling A palladium salt solution (containing 16.667 g of Pd) is weighed and added to 800 g of deionized water, and stirred until uniform. 980 g of $La-Al_2O_3$ powder is added to a palladium nitrate solution, which is rapidly stirred until uniform and then stands for 1 hour. Then the solution is dried in a vacuum at 80° C. for 8 hours and calcined at 550° C. for 2 hours, to obtain $Pd—Pt/La-Al_2O_3$ powder (which is yellowish brown powder). An adhesive is added to the yellowish brown powder to prepare a slurry, which is labeled as slurry A. A platinum salt solution (containing 3.333 g of Pt) is taken, pH of the noble metal solution is adjusted to 0.5, the solution with its pH properly adjusted is added to the slurry A and then ball-milled and mixed until uniform, and the mixture which already stands for 1 hour is coated on a cordierite ceramic honeycomb support having a mesh number of 400 cell/$in^2$ and a volume of 2.5 ml, and is then dried and calcined, to obtain a platinum-palladium catalyst having a noble metal content of 80 g/$ft^3$.

Example 3

Preparation of a Catalyst Firstly Supported with a Noble Metal Pt, and Supplemented with a Noble Metal Pd During Slurry Milling A platinum salt solution (containing 3.333 g of Pt) is weighed and added to 800 g of deionized water, and stirred until uniform. 980 g of $La—Al_2O_3$ powder is added to a palladium nitrate solution, which is rapidly stirred until uniform and then stands for 1 hour. Then the solution is dried in a vacuum at 80° C. for 8 hours and calcined at 550° C. for 2 hours, to obtain $Pd—Pt/La—Al_2O_3$ powder (which is yellowish brown powder). An adhesive is added to the yellowish brown powder to prepare a slurry, which is labeled as slurry A. A palladium salt solution (containing 16.667 g of Pd) is taken, pH of the noble metal solution is adjusted to 0.5, the solution with its pH properly adjusted is added to the slurry A and then ball-milled and mixed until uniform, and the mixture which already stands for 1 hour is coated on a cordierite ceramic honeycomb support having a mesh number of 400 cell/$in^2$ and a volume of 2.5 ml, and is then dried and calcined, to obtain a platinum-palladium catalyst having a noble metal content of 80 g/$ft^3$.

Example 4

Preparation of a Catalyst with a Ratio of an Amount of Noble Metal Firstly Supported (Pt:Pd=1:5) to an Amount of Noble Metal During Slurry Milling (Pt:Pd=1:5) of 5:5

A platinum salt solution and a palladium salt solution (containing 1.6665 g of Pt and 8.3335 g of Pd) are respectively weighed and added to 800 g of deionized water, and stirred until uniform. 980 g of $La—Al_2O_3$ powder is added to a palladium nitrate solution, which is rapidly stirred until uniform and then stands for 1 hour. Then the solution is dried in a vacuum at 80° C. for 8 hours and calcined at 550° C. for 2 hours, to obtain $Pd—Pt/La—Al_2O_3$ powder (which is yellowish brown powder). An adhesive is added to the yellowish brown powder to prepare a slurry, which is labeled as slurry A. A platinum salt solution and a palladium salt solution (containing 1.6665 g of Pt and 8.3335 g of Pd) are taken, pH of the noble metal solutions is adjusted to 0.5, the solutions with their pH properly adjusted are added to the slurry A and then ball-milled and mixed until uniform, and the mixture which already stands for 1 hour is coated on a cordierite ceramic honeycomb support having a mesh number of 400 cell/$in^2$ and a volume of 2.5 ml, and is then dried and calcined, to obtain a platinum-palladium catalyst having a noble metal content of 80 g/$ft^3$.

Example 5

Preparation of a Catalyst with a Ratio of an Amount of Noble Metal Firstly Supported (Pt:Pd=1:7) to an Amount of Noble Metal During Slurry Milling (Pt:Pd=1:2) of 4:1

A platinum salt solution and a palladium salt solution (containing 2 g of Pt and 14 g of Pd) are respectively weighed and added to 800 g of deionized water, and stirred until uniform. 980 g of $La-Al_2O_3$ powder is added to a palladium nitrate solution, which is rapidly stirred until uniform and then stands for 1 hour. Then the solution is dried in a vacuum at 80° C. for 8 hours and calcined at 550° C. for 2 hours, to obtain $Pd—Pt/La-Al_2O_3$ powder (which is yellowish brown powder). An adhesive is added to the yellowish brown powder to prepare a slurry, which is labeled as slurry A. A platinum salt solution and a palladium salt solution (containing 1.333 g of Pt and 2.667 g of Pd) are taken, pH of the noble metal solutions is adjusted to 0.5, the solutions with their pH properly adjusted are added to the slurry A and then ball-milled and mixed until uniform, and the mixture which already stands for 1 hour is coated on a cordierite ceramic honeycomb support having a mesh number of 400 cell/$in^2$ and a volume of 2.5 ml, and is then dried and calcined, to obtain a platinum-palladium catalyst having a noble metal content of 80 g/$ft^3$.

Example 6

Preparation of a Catalyst with a Ratio of an Amount of Noble Metal Firstly Supported (Pt:Pd=1:4.2) to an Amount of Noble Metal Pd During Slurry Milling of 6.5:1

A platinum salt solution and a palladium salt solution (containing 3.333 g of Pt and 14 g of Pd) are respectively weighed and added to 800 g of deionized water, and stirred until uniform. 980 g of $La—Al_2O_3$ powder is added to a palladium nitrate solution, which is rapidly stirred until uniform and then stands for 1 hour. Then the solution is dried in a vacuum at 80° C. for 8 hours and calcined at 550° C. for 2 hours, to obtain $Pd—Pt/La—Al_2O_3$ powder (which is yellowish brown powder). An adhesive is added to the yellowish brown powder to prepare a slurry, which is labeled as slurry A. A platinum salt solution (containing 2.667 g of Pd) is taken, pH of the noble metal solution is adjusted to 0.5, the solution with its pH properly adjusted is added to the slurry A and then ball-milled and mixed until uniform, and the mixture which already stands for 1 hour is coated on a cordierite ceramic honeycomb support with a mesh number of 400 cell/in² and a volume of 2.5 ml, and is then dried and calcined, to obtain a platinum-palladium catalyst with a noble metal content of 80 g/ft³.

Example 7

Preparation of a Catalyst with a Ratio of an Amount of Noble Metal Firstly Supported (Pt:Pd=1:7) to an Amount of Noble Metal During Slurry Milling (Pt:Pd=1:2) of 4:1 when a γ-$Al_2O_3$ Material is Used A platinum salt solution and a palladium salt solution (containing 2 g of Pt and 14 g of Pd) are respectively weighed and added to 1000 g of deionized water, and stirred until uniform. 980 g of γ-$Al_2O_3$ powder is added to a palladium nitrate solution, which is rapidly stirred until uniform and then stands for 1 hour. Then the solution is dried in a vacuum at 80° C. for 8 hours and calcined at 550° C. for 2 hours, to obtain Pd—Pt/La—$Al_2O_3$ powder (which is yellowish brown powder). An adhesive is added to the yellowish brown powder to prepare a slurry, which is labeled as slurry A. A platinum salt solution and a palladium salt solution (containing 1.333 g of Pt and 2.667 g of Pd) are taken, pH of the noble metal solutions is adjusted to 0.5, the solutions with their pH properly adjusted are added to the slurry A and then ball-milled and mixed until uniform, and the mixture which already stands for 1 hour is coated on a cordierite ceramic honeycomb support having a mesh number of 400 cell/in² and a volume of 2.5 ml, and is then dried and calcined, to obtain a platinum-palladium catalyst having a noble metal content of 80 g/ft³.

Example 8

Preparation of a Catalyst with a Ratio of an Amount of Noble Metal Firstly Supported (Pt:Pd=1:7) to an Amount of Noble Metal During Slurry Milling (Pt:Pd=1:2) of 4:1, when a Zr—Y/$Al_2O_3$ Material is Used A platinum salt solution and a palladium salt solution (containing 2 g of Pt and 14 g of Pd) are respectively weighed and added to 1000 g of deionized water, and stirred until uniform. 980 g of Zr—Y/$Al_2O_3$ powder is added to a palladium nitrate solution, which is rapidly stirred until uniform and then stands for 1 hour. Then the solution is dried in a vacuum at 80° C. for 8 hours and calcined at 550° C. for 2 hours, to obtain Pd—Pt/Zr—Y/$Al_2O_3$ powder (which is yellowish brown powder). An adhesive is added to the yellowish brown powder to prepare a slurry, which is labeled as slurry A. A platinum salt solution and a palladium salt solution (containing 1.333 g of Pt and 2.667 g of Pd) are taken, pH of the noble metal solutions is adjusted to 0.5, the solutions with their pH properly adjusted are added to the slurry A and then ball-milled and mixed until uniform, and the mixture which already stands for 1 hour is coated on a cordierite ceramic honeycomb support having a mesh number of 400 cell/in² and a volume of 2.5 ml, and is then dried and calcined, to obtain a platinum-palladium catalyst having a noble metal content of 80 g/ft³.

Figure 2:
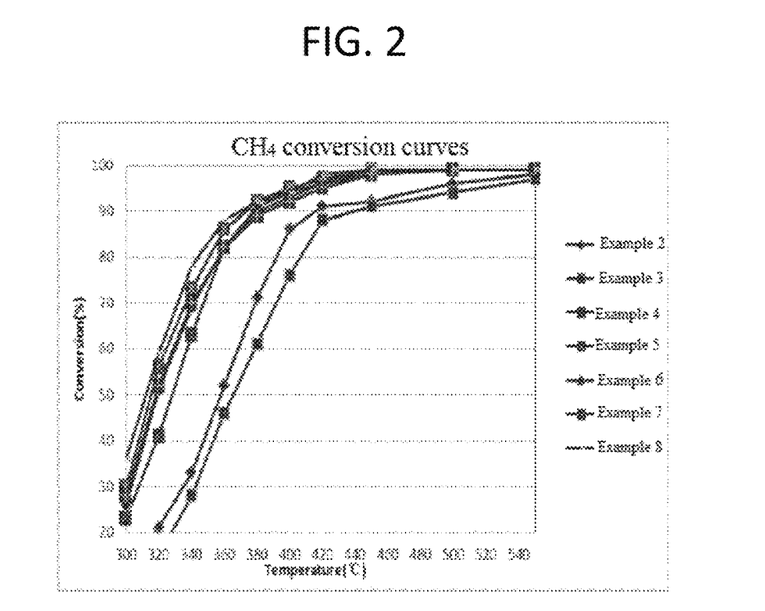
FIG. 2 is an activity evaluation result of catalysts prepared in examples 2-8.

The results of activity evaluation are shown in FIG. 2, which respectively represents the data of activity evaluation in Example 2, Example 3, Example 4, Example 5, Example 6, Example 7 and Example 8.

The results are shown in FIG. 2.

FIG. 2 Methane Conversion Curves in Different Examples

TABLE 2

Activity data of catalyst $CH_4$ of different examples

| NO. | $T_{50}$ (° C.) | $T_{90}$ (° C.) |
|---|---|---|
| Example 2 | 358 | 416 |
| Example 3 | 366 | 438 |
| Example 4 | 328 | 380 |
| Example 5 | 316 | 374 |
| Example 6 | 319 | 378 |
| Example 7 | 318 | 386 |
| Example 8 | 312 | 370 |

It can be learned from Table 2 that:

(1) The catalyst performance of Example 2 for $CH_4$ is superior to that of Example 3, which illustrates that the effect of Pd being firstly supported is better than that of Pt being firstly supported.

(2) When the same support material is used, the performance of Example 5 is superior to that of Example 1, Example 2, Example 3, Example 4, and Example 6.

(3) The catalyst performance of Example 8 for $CH_4$ is superior to that of Example 5 and Example 7, which illustrates that under the condition of a same preparation method, the materials had an effect on the catalyst, and the performance of the catalysts prepared with rare earth modified alumina are superior to that of the catalysts without modification.

Example 9

Preparation of a Catalyst Firstly Supported with Noble Metal Pt:Pd=1:1 when a γ-$Al_2O_3$ Material is Used A platinum salt solution and a palladium salt solution (containing 1 g of Pt and 1 g of Pd) are respectively weighed and added to 1000 g of deionized water, and stirred until uniform. 980 g of γ-$Al_2O_3$ powder is added to a palladium nitrate solution, which is rapidly stirred until uniform and then stands for 1 hour. Then the solution is dried in a vacuum at 80° C. for 8 hours and calcined at 550° C. for 2 hours, to obtain Pd—Pt/γ-$Al_2O_3$ powder (which is yellowish brown powder). An adhesive is added to the yellowish brown powder to prepare a slurry, which is labeled as slurry A. A platinum salt solution and a palladium salt solution (containing 2.3333 g of Pt and 15.6667 g of Pd) are taken, pH of the noble metal solutions is adjusted to 0.5, the solutions with their pH properly adjusted are added to the slurry A and then ball-milled and mixed until uniform, and the mixture which already stands for 1 hour is coated on a cordierite ceramic honeycomb support having a mesh number of 400 cell/in² and a volume of 2.5 ml, and is then dried and calcined, to obtain a platinum-palladium catalyst having a noble metal content of 80 g/ft³.

Example 10

Preparation of a Catalyst Firstly Supported with Noble Metal Pt:Pd=2:1 when a γ-$Al_2O_3$ Material is Used A platinum salt solution and a palladium salt solution (containing 2 g of Pt and 1 g of Pd) are respectively weighed and added to 1000 g of deionized water, and stirred until uniform. 980 g of γ-Al$_2$O$_3$ powder is added to a palladium nitrate solution, which is rapidly stirred until uniform and then stands for 1 hour. Then the solution is dried in a vacuum at 80° C. for 8 hours and calcined at 550° C. for 2 hours, to obtain Pd—Pt/γ-A1203 powder (which is yellowish brown powder). An adhesive is added to the yellowish brown powder to prepare a slurry, which is labeled as slurry A. A platinum salt solution and a palladium salt solution (containing 1.3333 g of Pt and 15.6667 g of Pd) are taken, pH of the noble metal solutions is adjusted to 0.5, the solutions with their pH properly adjusted are added to the slurry A and then ball-milled and mixed until uniform, and the mixture which already stands for 1 hour is coated on a cordierite ceramic honeycomb support having a mesh number of 400 cell/in$^2$ and a volume of 2.5 ml, and is then dried and calcined, to obtain a platinum-palladium catalyst having a noble metal content of 80 g/ft$^3$.

Example 11

Preparation of a Catalyst Firstly Supported with Noble Metal Pt:Pd=1:2 when a γ-Al$_2$O$_3$ Material is Used A platinum salt solution and a palladium salt solution (containing 1 g of Pt and 2 g of Pd) are respectively weighed and added to 1000 g of deionized water, and stirred until uniform. 980 g of γ-Al$_2$O$_3$ powder is added to a palladium nitrate solution, which is rapidly stirred until uniform and then stands for 1 hour. Then the solution is dried in a vacuum at 80° C. for 8 hours and calcined at 550° C. for 2 hours, to obtain Pd—Pt/γ-Al$_2$O$_3$ powder (which is yellowish brown powder). An adhesive is added to the yellowish brown powder to prepare a slurry, which is labeled as slurry A. A platinum salt solution and a palladium salt solution (containing 2.3333 g of Pt and 14.6667 g of Pd) are taken, pH of the noble metal solutions is adjusted to 0.5, the solutions with their pH properly adjusted are added to the slurry A and then ball-milled and mixed until uniform, and the mixture which already stands for 1 hour is coated on a cordierite ceramic honeycomb support having a mesh number of 400 cell/in$^2$ and a volume of 2.5 ml, and is then dried and calcined, to obtain a platinum-palladium catalyst having a noble metal content of 80 g/ft$^3$.

Example 12

Preparation of a Catalyst Firstly Supported with Noble Metal Pt:Pd=3:1 when a γ-Al$_2$O$_3$ Material is Used A platinum salt solution and a palladium salt solution (containing 3 g of Pt and 1 g of Pd) are respectively weighed and added to 1000 g of deionized water, and stirred until uniform. 980 g of γ-Al$_2$O$_3$ powder is added to a palladium nitrate solution, which is rapidly stirred until uniform and then stands for 1 hour. Then the solution is dried in a vacuum at 80° C. for 8 hours and calcined at 550° C. for 2 hours, to obtain Pd—Pt/γ-Al$_2$O$_3$ powder (which is yellowish brown powder). An adhesive is added to the yellowish brown powder to prepare a slurry, which is labeled as slurry A. A platinum salt solution and a palladium salt solution (containing 0.3333 g of Pt and 15.6667 g of Pd) are taken, pH of the noble metal solutions is adjusted to 0.5, the solutions with their pH properly adjusted are added to the slurry A and then ball-milled and mixed until uniform, and the mixture which already stands for 1 hour is coated on a cordierite ceramic honeycomb support having a mesh number of 400 cell/in$^2$ and a volume of 2.5 ml, and is then dried and calcined, to obtain a platinum-palladium catalyst having a noble metal content of 80 g/ft$^3$.

Example 13

Preparation of a Catalyst Firstly Supported with Noble Metal Pt:Pd=1:4 when a γ-Al$_2$O$_3$ Material is Used A platinum salt solution and a palladium salt solution (containing 1 g of Pt and 4 g of Pd) are respectively weighed and added to 1000 g of deionized water, and stirred until uniform. 980 g of γ-Al$_2$O$_3$ powder is added to a palladium nitrate solution, which is rapidly stirred until uniform and then stands for 1 hour. Then the solution is dried in a vacuum at 80° C. for 8 hours and calcined at 550° C. for 2 hours, to obtain Pd—Pt/γ-Al$_2$O$_3$ powder (which is yellowish brown powder). An adhesive is added to the yellowish brown powder to prepare a slurry, which is labeled as slurry A. A platinum salt solution and a palladium salt solution (containing 2.3333 g of Pt and 12.6667 g of Pd) are taken, pH of the noble metal solutions is adjusted to 0.5, the solutions with their pH properly adjusted are added to the slurry A and then ball-milled and mixed until uniform, and the mixture which already stands for 1 hour is coated on a cordierite ceramic honeycomb support having a mesh number of 400 cell/in$^2$ and a volume of 2.5 ml, and is then dried and calcined, to obtain a platinum-palladium catalyst having a noble metal content of 80 g/ft$^3$.

Example 14

Preparation of a Catalyst Firstly Supported with Noble Metal Pt:Pd=1:10 when a γ-Al$_2$O$_3$ Material is Used A platinum salt solution and a palladium salt solution (containing 1 g of Pt and 10 g of Pd) are respectively weighed and added to 1000 g of deionized water, and stirred until uniform. 980 g of γ-Al$_2$O$_3$ powder is added to a palladium nitrate solution, which is rapidly stirred until uniform and then stands for 1 hour. Then the solution is dried in a vacuum at 80° C. for 8 hours and calcined at 550° C. for 2 hours, to obtain Pd—Pt/γ-Al$_2$O$_3$ powder (which is yellowish brown powder). An adhesive is added to the yellowish brown powder to prepare a slurry, which is labeled as slurry A. A platinum salt solution and a palladium salt solution (containing 2.3333 g of Pt and 6.6667 g of Pd) are taken, pH of the noble metal solutions is adjusted to 0.5, the solutions with their pH properly adjusted are added to the slurry A and then ball-milled and mixed until uniform, and the mixture which already stands for 1 hour is coated on a cordierite ceramic honeycomb support having a mesh number of 400 cell/in$^2$ and a volume of 2.5 ml, and is then dried and calcined, to obtain a platinum-palladium catalyst having a noble metal content of 80 g/ft$^3$.

Figure 3:
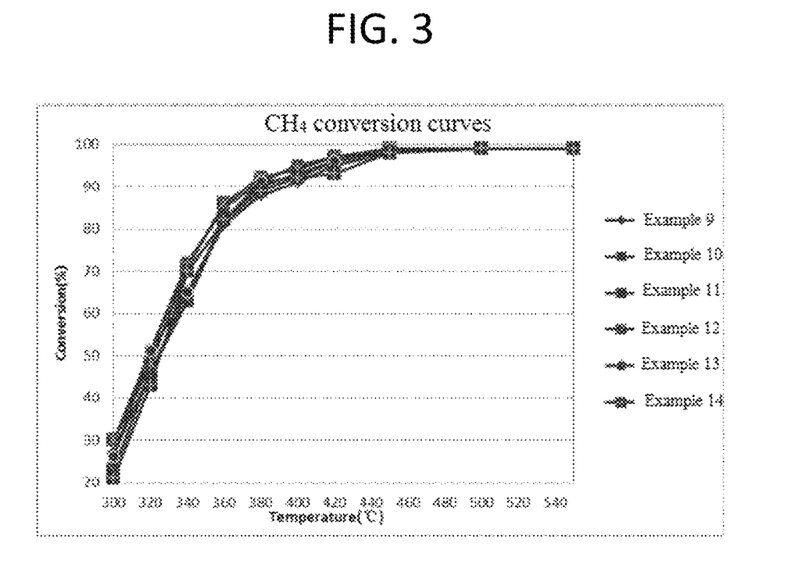
FIG. 3 is a graph showing $CH_4$ conversion curves for catalysts prepared in Examples 9-14.

The results of activity evaluation are shown in FIG. 3, which respectively represents the data of activity evaluation in Example 9, Example 10, Example 11, Example 12, Example 13 and Example 14

The results are shown in FIG. 3.

FIG. 3 Methane Conversion Curves in Different Examples

TABLE 3

Activity data of catalyst CH$_4$ in different examples

| No. | T$_{50}$ (° C.) | T$_{90}$ (° C.) |
| --- | --- | --- |
| Example 9 | 324 | 393 |
| Example 10 | 319 | 376 |
| Example 11 | 325 | 380 |
| Example 12 | 322 | 373 |
| Example 13 | 319 | 377 |
| Example 14 | 325 | 386 |

Example 15

Preparation of a Catalyst with Noble Metal Pt:Pd=1:1 During Slurry Milling when a γ-Al$_2$O$_3$ Material is Used A platinum salt solution and a palladium salt solution (containing 2.3333 g of Pt and 15.6667 g of Pd) are respectively weighed and added to 1000 g of deionized water, and stirred until uniform. 980 g of γ-Al$_2$O$_3$ powder is added to a palladium nitrate solution, which is rapidly stirred until uniform and then stands for 1 hour. Then the solution is dried in a vacuum at 80° C. for 8 hours and calcined at 550° C. for 2 hours, to obtain Pd—Pt/γ-Al$_2$O$_3$ powder (which is yellowish brown powder). An adhesive is added to the yellowish brown powder to prepare a slurry, which is labeled as slurry A. A platinum salt solution and a palladium salt solution (containing 1 g of Pt and 1 g of Pd) are taken, pH of the noble metal solutions is adjusted to 0.5, the solutions with their pH properly adjusted are added to the slurry A and then ball-milled and mixed until uniform, and the mixture which already stands for 1 hour is coated on a cordierite ceramic honeycomb support having a mesh number of 400 cell/in$^2$ and a volume of 2.5 ml, and is then dried and calcined, to obtain a platinum-palladium catalyst having a noble metal content of 80 g/ft$^3$.

Example 16

Preparation of a Catalyst with Noble Metal Pt:Pd=10:1 During Slurry Milling when a γ-Al$_2$O$_3$ Material is Used A platinum salt solution and a palladium salt solution (containing 0.3333 g of Pt and 16.3667 g of Pd) are respectively weighed and added to 1000 g of deionized water, and stirred until uniform. 980 g of γ-Al$_2$O$_3$ powder is added to a palladium nitrate solution, which is rapidly stirred until uniform and then stands for 1 hour. Then the solution is dried in a vacuum at 80° C. for 8 hours and calcined at 550° C. for 2 hours, to obtain Pd—Pt/γ-Al$_2$O$_3$ powder (which is yellowish brown powder). An adhesive is added to the yellowish brown powder to prepare a slurry, which is labeled as slurry A. A platinum salt solution and a palladium salt solution (containing 3 g of Pt and 0.3 g of Pd) are taken, pH of the noble metal solutions is adjusted to 0.5, the solutions with their pH properly adjusted are added to the slurry A and then ball-milled and mixed until uniform, and the mixture which already stands for 1 hour is coated on a cordierite ceramic honeycomb support having a mesh number of 400 cell/in$^2$ and a volume of 2.5 ml, and is then dried and calcined, to obtain a platinum-palladium catalyst having a noble metal content of 80 g/ft$^3$.

Example 17

Preparation of a Catalyst with Noble Metal Pt:Pd=1:10 During Slurry Milling when a γ-Al$_2$O$_3$ Material is Used A platinum salt solution and a palladium salt solution (containing 2.3333 g of Pt and 6.6667 g of Pd) are respectively weighed and added to 1000 g of deionized water, and stirred until uniform. 980 g of γ-Al$_2$O$_3$ powder is added to a palladium nitrate solution, which is rapidly stirred until uniform and then stands for 1 hour. Then the solution is dried in a vacuum at 80° C. for 8 hours and calcined at 550° C. for 2 hours, to obtain Pd—Pt/γ-Al$_2$O$_3$ powder (which is yellowish brown powder). An adhesive is added to the yellowish brown powder to prepare a slurry, which is labeled as slurry A.

A platinum salt solution and a palladium salt solution (containing 1 g of Pt and 10 g of Pd) are taken, pH of the noble metal solutions is adjusted to 0.5, the solutions with their pH properly adjusted are added to the slurry A and then ball-milled and mixed until uniform, and the mixture which already stands for 1 hour is coated on a cordierite ceramic honeycomb support having a mesh number of 400 cell/in$^2$ and a volume of 2.5 ml, and is then dried and calcined, to obtain a platinum-palladium catalyst having a noble metal content of 80 g/ft$^3$.

Example 18

Preparation of a Catalyst with Noble Metal Pt:Pd=1:5 During Slurry Milling when a γ-Al$_2$O$_3$ Material is Used A platinum salt solution and a palladium salt solution (containing 2.3333 g of Pt and 11.6667 g of Pd) are respectively weighed and added to 1000 g of deionized water, and stirred until uniform. 980 g of γ-Al$_2$O$_3$ powder is added to a palladium nitrate solution, which is rapidly stirred until uniform and then stands for 1 hour. Then the solution is dried in a vacuum at 80° C. for 8 hours and calcined at 550° C. for 2 hours, to obtain Pd—Pt/γ-Al$_2$O$_3$ powder (which is yellowish brown powder). An adhesive is added to the yellowish brown powder to prepare a slurry, which is labeled as slurry A. A platinum salt solution and a palladium salt solution (containing 1 g of Pt and 5 g of Pd) are taken, pH of the noble metal solutions is adjusted to 0.5, the solutions with their pH properly adjusted are added to the slurry A and then ball-milled and mixed until uniform, and the mixture which already stands for 1 hour is coated on a cordierite ceramic honeycomb support having a mesh number of 400 cell/in$^2$ and a volume of 2.5 ml, and is then dried and calcined, to obtain a platinum-palladium catalyst having a noble metal content of 80 g/ft$^3$.

Example 19

Preparation of a Catalyst with Noble Metal Pt:Pd=1:3 During Slurry Milling when a γ-Al$_2$O$_3$ Material is Used A platinum salt solution and a palladium salt solution (containing 2.3333 g of Pt and 13.6667 g of Pd) are respectively weighed and added to 1000 g of deionized water, and stirred until uniform. 980 g of γ-Al$_2$O$_3$ powder is added to a palladium nitrate solution, which is rapidly stirred until uniform and then stands for 1 hour. Then the solution is dried in a vacuum at 80° C. for 8 hours and calcined at 550° C. for 2 hours, to obtain Pd—Pt/γ-Al$_2$O$_3$ powder (which is yellowish brown powder). An adhesive is added to the yellowish brown powder to prepare a slurry, which is labeled as slurry A. A platinum salt solution and a palladium salt solution (containing 1 g of Pt and 3 g of Pd) are taken, pH of the noble metal solutions is adjusted to 0.5, the solutions with their pH properly adjusted are added to the slurry A and then ball-milled and mixed until uniform, and the mixture which already stands for 1 hour is coated on a cordierite ceramic honeycomb support having a mesh number of 400 cell/in$^2$ and a volume of 2.5 ml, and is then dried and calcined, to obtain a platinum-palladium catalyst having a noble metal content of 80 g/ft$^3$.

Figure 4:
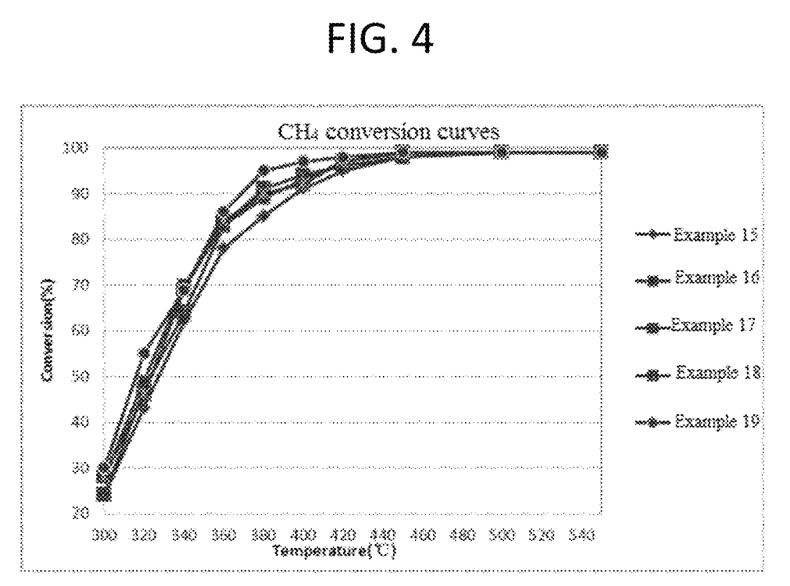
FIG. 4 is a graph showing $CH_4$ conversion curves for catalysts prepared in Examples 15-19.

The results of activity evaluation are shown in FIG. 4, which respectively represents the data of activity evaluation in Example 15, Example 16, Example 17, Example 18 and Example 19.

The results are shown in FIG. 4.

FIG. 4 Methane Conversion Curves in Different Examples

TABLE 4

Activity data of catalyst CH$_4$ in different examples

| No. | T$_{50}$ (° C.) | T$_{90}$ (° C.) |
| --- | --- | --- |
| Example 15 | 327 | 396 |
| Example 16 | 321 | 385 |
| Example 17 | 324 | 377 |
| Example 18 | 324 | 380 |
| Example 19 | 316 | 368 |

The bench test of vehicles is as follows:

Scheme 1: after being prepared in accordance with the method in Example 5, the slurry is coated on a support having a mesh number of 400 cell/in$^2$ and an external dimension of Φ150 mm (diameter)×100 (length). A finished catalyst (with Pt:Pd:Rh=1:5:0, 80 g/ft$^3$) is prepared.

Scheme 2: after being prepared in accordance with the method in Comparative example 1, the slurry is coated on a support having a mesh number of 400 cell/in$^2$ and an external dimension of Φ150 mm (diameter)×100 (length). A finished catalyst (with Pt:Pd:Rh=1:5:0, 80 g/ft$^3$) is prepared.

Scheme 3: after being prepared in accordance with the method in Comparative example 2, the slurry is coated on a support having a mesh number of 400 cell/in$^2$ and an external dimension of Φ150 mm (diameter)×100 (length). A finished catalyst (with Pt:Pd:Rh=1:5:0, 80 g/ft$^3$) is prepared. The abovementioned catalyst is installed on a bus with an engine model YC6L manufactured by certain company, and the bench test is performed in accordance with ETC test procedures as prescribed by National V Emission Standard in China. The results are as follows:

ETC Test Results of YC6L Engine, Table 4

| Test items | Standard limited values | Comparative example 1 | Comparative example 2 | Example 5 | Example 13 | Example 19 |
| --- | --- | --- | --- | --- | --- | --- |
| CO g/(kW · h) | 4.0 | 0.341 | 0.359 | 0.586 | 0.362 | 0.586 |
| NOx g/(kW · h) | 2.0 | 1.88 | 1.82 | 1.86 | 1.86 | 1.85 |
| CH$_4$ g/(kW · h) | 1.1 | 1.32 | 1.07 | 0.668 | 0.575 | 0.713 |
| NMHC g/(kW · h) | 0.55 | 0.51 | 0.463 | 0.259 | 0.302 | 0.276 |

It can be seen from the ETC test results of YC6L engine that after being installed with the catalysts of Examples 5, 13 and 19, the engine produces the minimal amount of emission pollutants, indicating that Examples 5, 13 and 19 are significantly better than Comparative examples 1 and 2 in CH$_4$ purification performance.

In this example, the catalysts with excellent CH$_4$ conversion performance prepared by the preparation methods of Examples 5, 13 and 19 have the optimal result when used for treatment of exhaust gases from lean-burn natural gas vehicles, and satisfy a wide variety of relevant standards and requirements in National V Emission Standard.

The invention claimed is:

1. A method for preparing a catalyst, comprising the following steps:
    (1) taking a noble metal salt solution A, adding a modified alumina support material, stirring until uniform and standing;
    (2) drying the material obtained in step (1) in a vacuum, and calcining at 500° C.-600° C. for 1-4 hours to obtain a powder material containing the noble metal;
    (3) mixing the powder material containing the noble metal prepared in step (2) with an adhesive and performing ball-milling, to obtain a uniform slurry;
    (4) preparing a noble metal solution B and adjusting pH to 0.5-1; and
    (5) mixing the slurry obtained in step (3) with the noble metal salt solution B, coating the mixture on a support, drying, and calcining at 500° C.-600° C. for 1-4 hours to obtain a target product; wherein the noble metal in the noble metal salt solution A and the noble metal salt solution B is one or more of palladium, platinum and rhodium.

2. The method for preparing a catalyst according to claim 1, characterized in that the noble metal salt solutions A and B are noble metal soluble salt solutions, the noble metal is palladium and/or platinum, and the soluble salt is nitrate, hydrochloride or ammonia salt.

3. The method for preparing a catalyst according to claim 2, characterized in that a concentration of the noble metal salt solution A is 0.1-2.0 wt %, wherein a weight ratio of Pt to Pd is 1:0-0:1.

4. The method for preparing a catalyst according to claim 2, characterized in that a concentration of the noble metal salt solution B is 0.1-2.0%, wherein a weight ratio of Pt to Pd is 1:0-0:1.

5. The method for preparing a catalyst according to claim 1, characterized in that the noble metal salt solution A includes palladium and/or platinum, a concentration of the noble metal salt solution A is 0.1-2.0 wt %, and a weight ratio of Pt to Pd is 1:0-0:1.

6. The method for preparing a catalyst according to claim 5, wherein the noble metal salt solution B includes palladium and/or platinum, a concentration of the noble metal salt solution B is 0.1-2.0%, and a weight ratio of Pd to Pt is 1:0-0:1.

7. The method for preparing a catalyst according to claim 6, wherein the weight ratio of Pt to Pd in the noble metal solution A is 1:7-1:4.2, and the weight ratio of Pd to Pt in the noble metal solution B is 6.5:1-1:7.

8. The method for preparing a catalyst according to claim 6, wherein a weight ratio of noble metal components in the noble metal solution A to noble metal components in the noble metal solution B is 1:9-9:1.

9. The method for preparing a catalyst according to claim 6, wherein each of the noble metal salt solutions A and B comprise a soluble noble metal salt solution, and the soluble noble metal salt is a nitrate or chloride salt of palladium and/or platinum.

10. The method for preparing a catalyst according to claim 6, further comprising allowing the stirred noble metal salt solution A to which the modified alumina support material has been added in step (1) to stand for more than 1 hour.

11. The method for preparing a catalyst according to claim 6, wherein step (2) comprises drying the material obtained in step (1) in a vacuum at a temperature of 80° C. to 100° C.

12. The method for preparing a catalyst according to claim 1, characterized in that a weight ratio of noble metal components contained in the noble metal solution A and in the noble metal solution B is 1:9-9:1.

13. The method for preparing a catalyst according to claim 1, characterized in that the noble metal salt solution B includes palladium and/or platinum, a concentration of the noble metal salt solution B is 0.1-2.0%, and a weight ratio of Pt to Pd is 1:0-0:1.

14. The method for preparing a catalyst according to claim 1, characterized in that the modified alumina support material is La—$Al_2O_3$ or $\gamma$-$Al_2O_3$.

15. The method for preparing a catalyst according to claim 1, characterized in that in step (1), the stirred noble metal salt solution A to which the modified alumina support material has been added stands for more than 0.5 hours.

16. The method for preparing a catalyst according to claim 1, characterized in that water content in the noble metal salt solution A in step (1) is 90% to 100% of a water absorption capacity of the modified alumina support material.

17. The method for preparing a catalyst according to claim 1, characterized in that step (2) comprises drying the material obtained in step (1) in a vacuum at a temperature of 80° C. to 100° C.

18. The method for preparing a catalyst according to claim 1, characterized in that after the slurry obtained in step (3) is mixed with the noble metal salt solution B, the mixture stands for 0.5 to 2 hours.

19. The method for preparing a catalyst according to claim 1, further comprising allowing the slurry mixed with the noble metal salt solution B to stand for 0.5 to 2 hours.

20. The method for preparing a catalyst according to claim 1, wherein the support comprises a ceramic honeycomb support or a metal honeycomb support.

\* \* \* \* \*